United States Patent [19]

Fujioka et al.

[11] Patent Number: 4,565,579

[45] Date of Patent: Jan. 21, 1986

[54] NONEXPLOSIVE CHEMICAL COMPOSITION FOR GENTLY BREAKING ROCK OR CONCRETE MASS

[75] Inventors: Isami Fujioka; Kazutoshi Imada; Motoyasu Nishimura; Takayuki Ishibashi, all of Ube, Japan

[73] Assignee: Central Glass Company, Limited, Ube, Japan

[21] Appl. No.: 545,695

[22] Filed: Oct. 26, 1983

[30] Foreign Application Priority Data

Oct. 28, 1982 [JP] Japan ............................ 57-188238
Jul. 22, 1983 [JP] Japan ............................ 58-132822

[51] Int. Cl.$^4$ .................... C04B 2/02; C04B 7/34; B02C 19/00
[52] U.S. Cl. ........................... 106/118; 106/119; 106/109; 423/175; 423/637
[58] Field of Search ............... 423/636, 637, 175; 106/109, 110, 118, 89, 121, 119

[56] References Cited

U.S. PATENT DOCUMENTS

| | | | |
|---|---|---|---|
| 843,277 | 2/1907 | Isaacs | 106/118 |
| 3,884,710 | 5/1975 | Allen et al. | 106/118 |
| 4,316,583 | 2/1982 | Kawano et al. | 106/109 |
| 4,354,877 | 10/1982 | Kawano et al. | 106/118 |
| 4,409,030 | 10/1983 | Minegishi et al. | 106/118 |

FOREIGN PATENT DOCUMENTS

| | | | |
|---|---|---|---|
| 621571 | 6/1961 | Canada | 423/637 |
| 436443 | 10/1935 | United Kingdom | 423/175 |
| 520829 | 5/1940 | United Kingdom | 423/637 |

Primary Examiner—Gary P. Straub
Attorney, Agent, or Firm—Schwartz, Jeffery, Schwaab, Mack, Blumenthal & Evans

[57] ABSTRACT

A nonexplosive chemical composition for gently and noiselessly breaking a rock or concrete mass. The composition comprises a principal component which is prepared by calcining a starting mixture comprising 100 parts by weight of quick lime and 1–20 parts by weight of calcium fluoride. In rock or concrete breaking operations, this composition in the form of aqueous slurry is poured into drill-holes and left to spontaneously hydrate and set with development of expansion pressure. For adequate retardation of the hydration, preferably a second fluoride such as $Na_2SiF_6$ which gives $CaF_2$ by reaction with CaO at the calcination temperature is added to the starting mixture. As an alternatively preferable method for the same purpose, an amino acid compound and/or a lignosulfonate is used as a hydration retarding agent which is mixed with the calcined principal component. Various auxiliary agents may optionally be added to this composition.

14 Claims, No Drawings

NONEXPLOSIVE CHEMICAL COMPOSITION FOR GENTLY BREAKING ROCK OR CONCRETE MASS

BACKGROUND OF THE INVENTION

This invention relates to a nonexplosive chemical composition for gently and noiselessly breaking a rock or concrete mass.

Explosives have widely been used in the field of civil engineering for breaking or cracking rocks or constructions of concrete and also for demolition of old buildings, and in some cases mechanical means have been employed instead of explosives to apply shocks to the objectives of breaking or demolishing. However, the breaking or demolishing operations by these means are accompanied by loud noises, intense vibrations and scattering of debris, and even generation of harmful gases in the cases of using explosives. Therefore, troublesome countermeasures are taken for ensuring safety and preventing pollution, but, nevertheless, the traditional methods are unsuited to practice in densely populated or densely built-up areas.

With a view to gently and noiselessly breaking a rock or concrete mass it has been devised to utilize an expansion pressure developed upon hydration of quick lime or calcium oxide, and some kinds of nonexplosive chemical compositions using calcined quick lime as the principal material have been developed and industrialized to some extent. Rock or concrete breaking compositions of this type are used in the form of an aqueous slurry, which is poured into holes drilled in the objectives of breaking. As the hydration proceeds the slurry sets with development of an expansion pressure, whereby cracks extend from the periphery of each drill-hole to result in gradual breaking of the rock or concrete mass.

However, conventional compositions of the above described type are not yet satisfactory for some reasons such as insufficiency of the expansion pressure, great dependence of the hydrating property on the ambient temperature and/or relatively low density of calcined calcium oxide in the powdery composition.

SUMMARY OF THE INVENTION

It is a primary object of the present invention to provide an improved nonexplosive chemical composition for gently breaking a rock or concrete mass by using quick lime as the principal material, in which composition calcium oxide is in a densely calcined state and which composition develops a sufficiently high expansion pressure when allowed to hydrate in the aforementioned manner.

It is another object of the invention to solve the problem that the rate of hydration of calcium oxide is greatly influenced by the ambient temperature with respect to the composition we provide to accomplish the primary object of the invention.

A rock or concrete breaking composition according to the invention comprises a principal component which is prepared by calcining a starting mixture comprising 100 parts by weight of quick lime and 1 to 20 parts by weight of calcium fluoride.

The starting mixture may optionally contain hydraulic gypsum, or $CaSO_4$ in other form, $Al_2O_3$, $SiO_2$ and/or $Fe_2O_3$ as auxiliary material(s). It is also optional to mix the above specified main component with at least one auxiliary agent such as water-reducing agent, supporting agent or extender, set retarding agent and/or viscosity increasing agent.

By the effect of $CaF_2$ present in the starting mixture CaO in the composition of the invention is in a densely calcined or sintered state, and this composition develops a high expansion pressure when allowed to hydrate in the form of aqueous slurry which is poured into holes drilled in a rock or concrete mass.

However, $CaF_2$ introduced into the breaking composition at the stage of preparing the starting mixture to be calcined is not significantly effective for retardation of the hydration of CaO. Therefore, sometimes and particularly when the ambient temperature is relatively high the users of the breaking composition will experience inconveniences due to excessively rapid hydration and setting of the composition used as an aqueous slurry.

Accordingly, usually it is desirable to add a highly effective hydration retarding agent to the composition of the invention, and it is preferred to employ either of the following two methods to incorporate a hydration retarding agent into this composition.

The first method is the addition of a second fluoride other than $CaF_2$ to the starting mixture by using a fluoride that gives $CaF_2$ by reaction with CaO at the temperatures employed in calcining the starting mixture. Typical examples of fluorides useful as the second fluoride are $NaF$, $Na_3AlF_6$ and $Na_2SiF_6$. In the calcined main component of the breaking composition obtained by this method, $CaF_2$ formed during calcination is very intimately mixed with and in contact with calcined CaO and acts as a strong hydration retarding agent. Preferably the amount of the second fluoride is so controlled as to give 0.5 to 10 parts by weight of $CaF_2$ per 100 parts by weight of quick lime in the starting mixture. Within this range the proportion of the second fluoride to $CaF_2$ directly added to quick lime is increased where it is desirable to augment the hydration retarding effect as in the cases of preparing a breaking composition to be used in the summer season, and the proportion is decreased where there is no need of greatly retarding the hydration as in the winter season.

By realizing coexistence of $CaF_2$ directly mixed with quick lime and $CaF_2$ originating from the second fluoride it is possible to obtain a breaking composition which develops a sufficiently high expansion pressure and exhibits an adequate rate of hydration when used at anticipated temperatures which may be either relatively high or relatively low. If the entire amount of $CaF_2$ in the composition is formed during the calcination of the starting mixture, that composition becomes unsuited to practical use because of insufficient expansion pressure and extremely slow hydration.

Another preferred method for effective retardation of the hydration is the addition of an amino acid compound and/or a lignosulfonate to the main component prepared by calcination of the starting mixture containing quick lime and $CaF_2$. The total amount of the amino acid compound and/or lignosulfonate may be up to 10 parts by weight per 100 parts by weight of quick lime in the starting material, but usually does not need to exceed 8 parts by weight.

By this method it is easy to obtain very high hydration retarding effect, and it is also possible to accurately control the rate of hydration. Besides, this method offers no inconvenience to the calcination operation to prepare the main component of the breaking composition since the amino acid compound and/or lignosulfonate are introduced after the calcination operation.

DESCRIPTION OF THE PREFERRED EMBODIMENTS

In the present invention CaO and $CaF_2$ are two fundamental materials of a rock or concrete breaking composition. Use is made of quick lime since CaO in this invention needs not to be a refined material. As to $CaF_2$, either natural fluorite or synthetic $CaF_2$ can be used. Also it is possible to use $CaF_2$ obtained by neutralization of waste fluorine in a certain chemical process.

As mentioned hereinbefore, when a powder mixture of quick lime and $CaF_2$ is calcined the coexistence of $CaF_2$ has the effect of increasing the density of calcined CaO, and a breaking composition using the resultant clinker develops high expansion pressure when it undergoes hydration in a drill-hole. A suitable range of the amount of $CaF_2$ is from 1 to 20 parts by weight per 100 parts by weight of CaO. When the amount of $CaF_2$ is smaller the effects expected of the presence of $CaF_2$ will remain insufficient, but the effects no longer significantly augment when the amount of $CaF_2$ is increased beyond 20 parts by weight.

Besides $CaF_2$, it is optional and rather preferable to add hydraulic gypsum to quick lime to be calcined because $CaSO_4$ is effective for increasing the density of calcined CaO and also for somewhat retarding the hydration of CaO. It is suitable that the amount of gypsum does not exceed 20 parts by weight, and preferably does not exceed 5 parts by weight, per 100 parts by weight of CaO from the viewpoint of preparing a composition containing a sufficiently large amount of CaO. As the hydraulic gypsum use can be made of α-hemihydrate gypsum, β-hemihydrate gypsum or type-II anhydrous gypsum, though the use of α- or β-hemihydrate gypsum is preferable considering the rate of hydration. In place of hydraulic gypsum or a part thereof, $SiO_2$, $Al_2O_3$ and/or $Fe_2O_3$ may optionally be added to quick lime because complex compounds of such oxides with CaO formed during the calcination are effective for somewhat retarding the hydration of CaO. It is suitable that the total amount of such oxide(s) and gypsum does not exceed 20 parts by weight per 100 parts by weight of CaO.

The calcination of a powder mixture of quick lime and $CaF_2$, possibly containing the optional additive(s), is carried out at a temperature in the range from about 800° C. to about 1400° C. If the firing temperature is below 800° C. it is difficult to achieve good sintering, but the employment of a firing temperature higher than 1400° does not produce any extra effect.

A clinker obtained by the calcination is ground to a suitable particle size, usually to pass through a 60-mesh screen. Although the ground clinker itself serves as a rock or concrete breaking composition, the practicability of the composition can further be improved by adding suitably selected assistant or auxiliary agents to the ground clinker. For example, an expansion agent, water-reducing agent, viscosity increasing agent, set retarding agent and/or an extender may be added.

An expansion agent can be selected from aluminum compounds such as aluminum silicate, alunite, zeolite and bauxite and calcium aluminate base materials such as water-quenched slag.

Examples of water-reducing agents useful in the present invention are lignins, sulfonates of higher polyhydric alcohols and their high condensation compounds, compound polyols, water soluble melamine resins and formalin condensates of β-naphthalenesulfonic acid.

As a viscosity increasing agent use can be made of a water soluble polymer such as methyl cellulose, carboxymethyl cellulose, polyvinyl alcohol or sodium polyacrylate.

As a set retarding agent, a suitable one or a suitable combination can be selected from some carboxylic acids such as citric acid, succinic acid, malic acid, malonic acid and tartaric acid and their salts, polysaccharides such as sucrose, phosphates such as sodium tripolyphosphate, sodium pyrophosphate and calcium phosphate, boron compounds such as borax, copper compounds, amino acids and some products of proteolysis.

As an extender it is suitable to use hydraulic gypsum such as α-hemihydrate gypsum, β-hemihydrate gypsum or type II anhydrous gypsum. Also it is possible to use calcium carbonate, silica or alumina in place of hydraulic gypsum or a part thereof. The amount of the extender may be up to 30 parts by weight per 100 parts by weight of the ground clinker containing CaO and $CaF_2$. The amount of each of the other auxiliary agents may be up to 2 parts by weight per 100 parts by weight of the ground clinker.

A rock or concrete breaking composition of the invention is used in the form of an aqueous slurry, which is prepared at the operation site by mixing 100 parts by weight of the composition (including auxiliary agents, when employed) with about 30–40 parts by weight of water. The slurry is poured into drill-holes bored in a rock or concrete mass to be broken and left standing in the holes. After the lapse of a certain period of time, the hydration of CaO in the slurry proceeds at a considerably increased rate to result in setting and expansion of the slurry in the drill-holes. Consequently cracks develop in the rock or concrete mass from the periphery of each drill-hole, and the mass noiselessly breaks into relatively small pieces or lumps.

As described hereinbefore, one method of efficiently retarding the hydration of a rock or concrete breaking composition of the invention is to cause formation of extra $CaF_2$ during calcination of a starting powder mixture of quick lime and $CaF_2$ by adding a second fluoride other than $CaF_2$ to the starting mixture. The second fluoride must be one that gives $CaF_2$ by reacting with CaO at the calcination temperature. Such a fluoride can be selected, for example, from NaF, KF, $Na_3AlF_6$, $AlF_3$, $NH_4F$, HF and $Na_2SiF_6$.

It is suitable to determine the amount of the additional fluoride such that $CaF_2$ originating from the additional fluoride amounts to 0.5 to 10 parts by weight, and preferably 1 to 4 parts by weight, per 100 parts of quick lime subjected to calcining. It is preferred that the total amount of $CaF_2$ directly added to quick lime and $CaF_2$ originating from the second fluoride is at least 6 parts by weight per 100 parts by weight of quick lime. The amount of the second fluoride and the proportion of $CaF_2$ originating from the second fluoride to $CaF_2$ directly added to quick lime are controlled according to a desired rate of hydration of the breaking composition or ambient temperatures at which the breaking composition is to be used: the amount or proportion of the former $CaF_2$ is rendered relatively large when it is desired to augment the hydration retarding effect as in the cases of using the breaking composition at relatively high ambient temperatures.

Another method of efficiently retarding the hydration of a breaking composition of the invention is to use an amino acid compound and/or a lignosulfonate as a hydration retarding agent, which is added to a clinker obtained by calcination of the starting mixture containing quick lime and $CaF_2$. Examples of amino acids useful for this purpose are neutral amino acids such as glycine, alanine, valine and leucine, acidic amino acids such as aspartic acid and glutamic acid, basic amino acids such as lysine and arginine, sulfur-containing amino acids such as methionine, cystine and cysteine and aromatic amino acids such as phenylalanine and their salts. Examples of lignosulfonates useful for this purpose are alkali metal salts and alkaline earth metal salts of lignosulfonic acids.

.Amino acid compounds are highly effective for retardation of the hydration of CaO. Lignosulfonates are lower in the hydration retarding effect than amino acid compounds, but after the commencement of the hydration reaction lignosulfonates become effective for acceleration of the rate of the hydration reaction. Accordingly, it is favorable to use a combination of an amino acid compound and a lignosulfonate as a hydration retarding agent for accurately controlling the length of time that will pass until break of a rock or concrete mass by the action of the breaking composition. A suitable amount of the amino acid compound and/or lignosulfonate employed as a hydration retarding agent is from 0.1 to 8 parts by weight per 100 parts by weight of the clinker prepared as the essential part of the breaking composition. Also in this case the hydration retarding agent will be used in a relatively large amount when it is intended to use the breaking composition at relatively high ambient temperatures, but an increase of this retarding agent beyond 8 parts by weight per 100 parts of the clinker no longer produces significant augmentation of the hydration retarding effect. When this method is employed it is suitable that the amount of $CaF_2$ initially added to 100 parts by weight of quick lime is 2 to 10 parts by weight.

The addition of the above described hydration retarding agent is not necessarily carried out at the manufacturing stage. Since the rate of hydration of a breaking composition of the invention depends considerably on the ambient temperature, it is rather better to adjust the amount of the hydration retarding agent at the site of rock or concrete breaking operation according to the ambient temperature at the time of the breaking operation. However, it is inconvenient to weigh out a suitable amount of the hydration retarding agent at the operation site.

Accordingly, in industrially supplying a composition of the invention to the users it is preferable to separately package the main part containing at least calcined CaO and $CaF_2$ and the hydration retarding agent and to divide a permissible maximum amount of the hydration retarding agent into a plurality of packets each of which contains a predetermined amount of the retarding agent. For example, a package of 100 parts by weight of the main part of the breaking composition will be sold with attachment of five separate packets each of which contains 1 part by weight of the retarding agent so that the users may mix the contents of a suitable number of the retarding agent packets with 100 parts of the main part of the breaking composition at the stage of preparing an aqueous slurry of the composition. For example, only one packet of the retarding agent will be used when the ambient temperature is 0°–10° C. but three packets will be used when the temperature is 20°–30° C. By doing so, the length of time between pouring of the slurry into the drill-holes and breaking of the rock or concreter mass can be rendered optimum and nearly constant irrespective of the ambient temperature. It will be expedient to bug the hydration retarding agent in powder form, but it is also possible to process the retarding agent into the form of tablets. An instruction manual containing a table or nomogram will be attached to the separately packaged composition to inform the users of the relation between ambient temperature and the quantity of the hydration retarding agent to be used. If desired, some of the auxiliary agents described hereinbefore, such as extender, viscosity increasing agent, etc., may be packaged together with the dehydration retarding agent.

EXAMPLE 1

A powder mixture was prepared by adding 15 parts by weight of powdered fluorite ($CaF_2$ 97 Wt %) and 3 parts by weight of $CaSO_4$ to 100 parts by weight of quick lime (CaO 90 Wt %) precedingly pulverized to pass through a 100-mesh screen. In an electric furnace the mixture was calcined at 1200° C. for 2 hr to obtain a clinker. After cooling to room temperature the clinker was ground to pass through a 60-mesh screen. By analysis the content of CaO in the clinker was 76.3% by weight and the content of $CaF_2$ was 12.7% by weight.

A breaking composition was prepared by mixing 98.3 parts by weight of the ground clinker with 1.7 parts by weight of a commercial water-reducing agent (abbreviated to WR) of which the principal component was a water-soluble melamine resin.

An aqueous slurry of this breaking composition prepared by using water amounting to 30% by weight of the powdery breaking composition was poured into a 3 cm diameter and 40 cm long hole bored in a concrete block which was 100 cm×100 cm×100 cm in dimensions. The ambient temperature at the testing was 5° C. Cracking of the concrete block began upon pouring of the slurry and rapidly proceeded to soon reach breaking of the block.

EXAMPLE 2

Added to 100 parts by weight of the quick lime powder used in Example 1 was 9 parts by weight of the fluorite powder used in Example 1 and, furthermore, NaF was added in such an amount as to form 1 part by weight of $CaF_2$ by reaction with CaO. The resultant powder mixture was calcined in an electric furnace at 1200° C. for 2 hr to obtain a clinker, which was cooled to room temperature and ground to pass through a 60-mesh screen. By X-ray analysis of this clinker it was confirmed that NaF in the starting mixture had entirely converted to $CaF_2$. In this clinker the content of CaO was 81.1% by weight and the total content of $CaF_2$ was 9.1% by weight.

Without adding any auxiliary agent the ground clinker was used as a breaking composition. In the form of an aqueous slurry prepared by adding 30% by weight of water to the powdery clinker, this composition was tested in the same manner as in Example 1. It took 14 hr to break the concrete block

EXAMPLES 3–7

In these examples the process of Example 2 was differently modified in the following points.

(1) The amount of fluorite added to 100 parts of quick lime was varied.

(2) Alternative to NaF, either $Na_3AlF_6$ or $Na_2SiF_6$ was used in different amounts as an additional fluoride that gives $CaF_2$ by reaction with CaO.

(3) As an auxiliary material $CaSO_4$, $Al_2O_3$ or $SiO_2$ was added to the mixture of quick lime and fluorides.

(4) Either the water-reducing agent WR used in Example 1 or α-hemihydrate gypsum (supporting agent) was added to the ground clinker to prepare a breaker composition.

The following Table 1 shows the details of the breaking compositions and the starting powder mixtures in these examples. The breaking compositions of these examples were tested in the same manner as in Example 1. The test results are presented in Table 1 together with the corresponding data of the samples of References 1 and 2 described below.

REFERENCE 1

The quick lime powder used in Example 1 was mixed with $Na_2SiF_6$ and $CaSO_4$ without using fluorite, and the clinker obtained by calcination of the starting mixture was ground and mixed with α-hemihydrate gypsum.

REFERENCE 2

Reference 1 was modified in that the amount of $Na_2SiF_6$ was increased and that the water-reducing agent WR was used in place of hemihydrate gypsum.

Example 1 and 3 parts by weight of powdered hemihydrate gypsum. The mixture was calcined in an electric furnace at 1200° C. for 4 hr to obtain a clinker. After cooling to room temperature the clinker was ground to pass through a 60-mesh screen. A powdery breaking composition was prepared by mixing 100 parts by weight of the ground clinker with 20 parts by weight of $CaCO_3$ used as extender, 1 part by weight of the water-reducing agent WR used in Example 1 and 0.5 parts by weight of a hydration retarding agent, which was a mixture of 20 parts by weight of calcium lignosulfonate and 80 parts by weight of a commercial amino acid compound composition (will be referred to as AM) of which the principal component was sodium glutamate. (This hydration retarding agent will be referred to as the retarding agent HR.)

An aqueous slurry of this breaking composition prepared by using water amounting to 30% by weight of the powdery composition was poured into a steel pipe having an inner diameter of 35 mm and a length of 1000 mm, and the magnitude of tensile strain produced in the steel pipe was measured at predetermined time intervals. The ambient temperature was 5° C. The maximum expansion pressure developed by the setting of the breaker composition in the pipe was calculated from the measured values of the strain to be above 350 kg/cm$^2$, and the length of time lapsed before the expansion pres-

TABLE 1

| | Additive to 100 parts of Quick Lime (parts by wt.) | | | | Analysis of Breaking Composition (wt %) | | | | | Testing | |
|---|---|---|---|---|---|---|---|---|---|---|---|
| | | | | | Clinker | | | | | Water Used | Time Lapsed before Break |
| | $CaF_2$ (Fluorite) | Additional Fluoride* | | Auxiliary | CaO | Total $CaF_2$ | Others | Auxiliary | | for Slurrying (wt %) | of Concrete (hr) |
| Ex. 2 | 9 | NaF | 1 | — | 81.1 | 9.1 | 9.8 | — | | 30 | 14 |
| Ex. 3 | 6 | $Na_3AlF_6$ | 2 | $CaSO_4$ 4 | 69.9 | 6.3 | 12.0 | Gypsum | 11.8 | 40 | 20 |
| Ex. 4 | 5 | $Na_2SiF_6$ | 3 | $Al_2O_3$ 3 | 78.2 | 7.1 | 12.9 | WR | 1.8 | 30 | 32 |
| Ex. 5 | 4 | $Na_2SiF_6$ | 4 | $SiO_2$ 3 | 77.7 | 7.1 | 13.4 | WR | 1.8 | 30 | 48 |
| Ex. 6 | 2 | NaF | 4 | $CaSO_4$ 5 | 77.0 | 5.3 | 15.9 | WR | 1.8 | 30 | 48 |
| Ex. 7 | 10 | $Na_2SiF_6$ | 5 | $CaSO_4$ 5 | 62.2 | 10.8 | 12.6 | Gypsum | 14.4 | 40 | 48 |
| Ref. 1 | — | $Na_2SiF_6$ | 1 | $CaSO_4$ 3 | 72.1 | 0.8 | 11.0 | Gypsum | 16.1 | 40 | rapid reaction after lapse of 15 min |
| Ref. 2 | — | $Na_2SiF_6$ | 7 | $CaSO_4$ 3 | 76.9 | 6.3 | 15.0 | WR | 1.8 | 30 | >100 |

*The amount of the additional fluoride refers to the amount (parts by wt.) of $CaF_2$ formed from the additional fluoride.

As can be seen in Table 1, the breaking compositions of Examples 3–7 exhibited a strong but adequately slow breaking effect on concrete at a relatively low temperature of about 5° C. This is attributed to the joint use of $CaF_2$ (fluorite) and another fluoride in the starting mixture to be calcined. Such a good effect cannot be obtained when $CaF_2$ is absent in the starting mixture as in the cases of References 1 and 2. The breaking composition of Reference 1, which contained only a very small amount of $CaF_2$ originated from $Na_2SiF_6$, underwent rapid and violent hydration reaction with poor reproducibility. In the case of Reference 2 wherein the amount of $Na_2SiF_6$ was increased, the hydration retarding effect became so strong that the breaking composition was impracticable.

EXAMPLE 8

A powder mixture was prepared by mixing 100 parts by weight of the quick lime powder used in Example 1 with 5 parts by weight of the fluorite powder used in sure reached 300 kg/cm$^2$ was 16 hr.

EXAMPLES 9–24

In these examples the process of Example 8 was modified in the following points.

(1) The amounts of fluorite and gypsum added to 100 parts by weight of quick lime were varied.

(2) Alternative to $CaCO_3$ use was made of $SiO_2$.

(3) The amount of the hydration retarding agent HR was varied, and in some examples either the aforementioned amino acid compound composition AM (principally sodium glutamate) or calcium lignosulfonate (will be referred to as LS) was singly used as hydration retarding agent.

The following Table 2 shows the details of the breaking compositions and the starting powder mixtures in these examples. The breaking compositions of these examples were tested by the method described in Example 8, though the ambient temperature was different in some cases. The test results are presented in Table 2.

TABLE 2

| | Materials of Clinker (parts by wt.) | | | Additives to 100 parts of Ground Clinker (parts by wt.) | | | Testing | | |
|---|---|---|---|---|---|---|---|---|---|
| | CaO (Lime) | CaF$_2$ (Fluor) | CaSO$_4$ (Gypsum) | Hydration Retarding Agent | Extender*[1] | Water-reducing Agent | Ambient Temp. (°C.) | Maximum Expansion Pressure (kg/cm$^2$) | Expansion Time*[2] (hr) |
| Ex. 8 | 100 | 5 | 3 | HR 0.5 | 20 | 1 | 5 | >350 | 16 |
| Ex. 9 | 100 | 5 | 3 | HR 1.0 | 20 | 1 | 10 | >350 | 14 |
| Ex. 10 | 100 | 5 | 3 | HR 1.5 | 20 | 1 | 20 | >350 | 12 |
| Ex. 11 | 100 | 5 | 3 | HR 2.0 | 20 | 1 | 30 | >350 | 10 |
| Ex. 12 | 100 | 2 | 3 | HR 0.5 | 20 | 1 | 5 | >350 | 17 |
| Ex. 13 | 100 | 10 | 3 | HR 0.1 | 20 | 1 | 5 | >350 | 16 |
| Ex. 14 | 100 | 5 | 5 | HR 0.1 | 20 | 1 | 5 | >350 | 16 |
| Ex. 15 | 100 | 5 | 0.5 | HR 1.5 | 20 | 1 | 20 | >350 | 10 |
| Ex. 16 | 100 | 5 | 3 | HR 3 | 20 | 1 | 25 | >350 | 11 |
| Ex. 17 | 100 | 5 | 3 | HR 5 | 20 | 1 | 35 | >350 | 11 |
| Ex. 18 | 100 | 5 | — | HR 1.5 | 20 | 1 | 20 | >350 | 16 |
| Ex. 19 | 100 | 5 | 3 | AM 1.5 | 20 | 1 | 20 | >350 | 20 |
| Ex. 20 | 100 | 5 | 3 | LS 1.5 | 20 | 1 | 20 | >350 | 9 |
| Ex. 21 | 100 | 1.8 | 3 | HR 0.5 | 20 | 1 | 5 | 200 | |
| Ex. 22 | 100 | 11 | 3 | HR 0.1 | 20 | 1 | 5 | 250 | |
| Ex. 23 | 100 | 5 | 3 | AM 5.5 | 20 | 1 | 35 | >350 | 45 |
| Ex. 24 | 100 | 5 | 3 | LS 5.5 | 20 | 1 | 35 | >350 | 35 |

*CaCO$_3$ in Examples 8 and 9, SiO$_2$ in Examples 10-24.
*Time lapsed before the expansion pressure reached 300 kg/cm$^2$.

As represented by the experimental results shown in Table 2, breaking compositions according to the invention, which contain an amino acid compound and/or a lignosulfonate together with CaF$_2$, are large in the maximal value of the expansion pressure, and their compositions can be adjusted such that the expansion pressure reaches a desirable level in an adequately short time when used at temperatures in an anticipated range.

What is claimed is:

1. A chemical composition for gently breaking a rock or concrete mass, the composition comprising a principal component which is prepared by calcining a starting mixture comprising 100 parts by weight of quick lime, 1 to 20 parts by weight of calcium fluoride and an additional fluoride which gives CaF$_2$ by reaction with CaO, said calcining performed at a temperature of from about 800° C. to about 1400° C. to produce a sintered starting mixture;
    wherein the amount of said additional fluoride in said starting mixture is sufficient to produce an additional amount of CaF2 of from 0.5 to 10 parts by weight per 100 parts by weight of said quick lime, and wherein said additional fluoride is selected from the group consisting of NaF, KF, AlF$_3$, NH$_4$F, HF, Na$_3$AlF$_6$ and Na$_2$SiF$_6$.

2. A chemical composition according to claim 1, wherein said starting mixture further comprises at least one auxiliary material selected from the group consisting of CaSO$_4$, Al$_2$O$_3$, SiO$_2$ and Fe$_2$O$_3$, the total amount of said at least one auxiliary material being not larger than 20 parts by weight per 100 parts by weight of said quick lime, said auxiliary material present in addition to the materials in said quick lime.

3. A chemical composition according to claim 2, wherein said CaSO$_4$ is in the form of hydraulic gypsum.

4. A chemical composition according to claim 1, further comprising a water-reducing agent which is selected from the group consisting of lignins, sulfonates of higher polyhydric alcohols and condensation compounds thereof, compound polyols, water soluble melamine resins and formalin condensates of β-naphthalenesulfonic acid and mixed with said main component, said water-reducing agent amounting to up to 2% by weight of said principal component.

5. A chemical composition according to claim 1, further comprising hemihydrate gypsum which is mixed with said principal component and amounts to up to 30% by weight of said principal component.

6. A chemical composition according to claim 1, further comprising a set retarding agent which is selected from the group consisting of carboxylic acids and salts thereof, polysaccharides, phosphates, boron compounds, copper compounds, amino acids and proteolysis products and mixed with said principal component, said set retarding agent amounting to up to 2% by weight of said principal component.

7. A chemical composition according to claim 1, further comprising a viscosity increasing agent which is selected from the group consisting of methyl cellulose, carboxymethyl cellulose, polyvinyl alcohol and sodium polyacrylate and mixed with said principal component, said viscosity increasing agent amounting to up to 2% by weight of said principal component.

8. A chemical composition according to claim 1, further comprising an extender which is selected from the group consisting of CaSO$_4$, CaCO$_3$, Al$_2$O$_3$ and SiO$_2$ and mixed with said principal component, said extender amounting to up to 30% by weight of said principal component.

9. A chemical composition according to claim 1, wherein the amount of said additional fluoride is such that CaF$_2$ originating from said additional fluoride becomes 1 to 4 parts by weight per 100 parts by weight of said quick lime.

10. A chemical composition according to claim 9, wherein the total amount of CaF2 in said principal component is at least 6 parts by weight per 100 parts by weight of said quick lime.

11. A chemical composition for gently breaking a rock or concrete mass, the composition comprising a principal component which is prepared by calcining a starting mixture comprising 100 parts by weight of quick lime and 1 to 20 parts by weight of calcium fluoride at a temperature of from about 800° C. to about 1400° C. to produce a sintered starting mixture, said composition further comprising a hydration retarding agent which is selected from the group consisting of glycine, alanine, valine, leucine, aspartic acid, glutamic acid, lysine, arginine, methionine, cystine, cystein and phenylalanine, and salts thereof, in amounts to up to 10% by weight of said principal component.

12. A chemical composition according to claim 11, wherein the amount of said calcium fluoride is 2 to 10 parts by weight per 100 parts by weight of said quick lime.

13. A chemical composition according to claim 11, wherein said hydration retarding agent further comprises a lignosulfonate selected from the group consisting of alkali metal salts and alkaline earth salts of lignosulfonic acids.

14. A chemical composition according to claim 11, wherein said starting mixture further comprises hydraulic gypsum which amounts to up to 5 parts by weight per 100 parts by weight of said quick lime.

* * * * *